United States Patent
D'Alterio et al.

(10) Patent No.: US 8,392,547 B2
(45) Date of Patent: Mar. 5, 2013

(54) METHOD, SYSTEM AND COMPUTER PROGRAM FOR HARDWARE INVENTORY IN VIRTUALIZED ENVIRONMENTS

(75) Inventors: Domenico D'Alterio, Rome (IT); Marco Mechelli, Rome (IT); Paolo Salerno, Mavterotondo (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1430 days.

(21) Appl. No.: 11/532,121

(22) Filed: Sep. 15, 2006

(65) Prior Publication Data

US 2007/0067433 A1 Mar. 22, 2007

(51) Int. Cl.
*G06F 15/16* (2006.01)
*G06F 9/455* (2006.01)
(52) U.S. Cl. .............................. 709/223; 718/1; 705/908
(58) Field of Classification Search .......... 709/212–226; 711/147–153; 718/1, 100–108
See application file for complete search history.

(56) References Cited

U.S. PATENT DOCUMENTS

| | | | | |
|---|---|---|---|---|
| 6,959,291 B1* | 10/2005 | Armstrong et al. | ............. | 705/59 |
| 7,096,469 B1* | 8/2006 | Kubala et al. | ................. | 718/100 |
| 7,278,142 B2* | 10/2007 | Bandhole et al. | ............ | 718/104 |
| 7,313,512 B1* | 12/2007 | Traut et al. | ....................... | 703/23 |
| 2002/0069369 A1* | 6/2002 | Tremain | ........................ | 713/201 |
| 2003/0051021 A1* | 3/2003 | Hirschfeld et al. | ........... | 709/223 |
| 2006/0004667 A1* | 1/2006 | Neil | ............................... | 705/59 |

* cited by examiner

*Primary Examiner* — Shirley Zhang
(74) *Attorney, Agent, or Firm* — Garg Law Firm, PLLC; Rakesh Garg; Libby Z. Toub

(57) ABSTRACT

The invention proposes a solution for controlling logical guest machines, such as virtual machines or logical partitions, in a system management application (and especially in a licensing application). There is provided an enabler running in a physical host machine implementing the guest machines or in a corresponding console; this enabler gathers information relating to the hardware configuration of the host machine (which information is not available inside the guest machine). The hardware configuration information is then passed to a licensing agent of the guest machine; for example, the desired result may be achieved by means of dedicated variables or registry keys that are accessible without providing any user credentials. The licensing agent directly gathers other information, for example, indicating the software products that are used by the guest machine. The available information is then transmitted by the licensing agent to a runtime server for the correct management of the guest machine.

20 Claims, 5 Drawing Sheets

METHOD, SYSTEM AND COMPUTER PROGRAM FOR HARDWARE INVENTORY IN VIRTUALIZED ENVIRONMENTS

FIELD OF THE INVENTION

The present invention relates to the data processing field. More specifically, the present invention relates to the management of a data processing system.

BACKGROUND ART

Applications for managing data processing systems with distributed architecture are commonly used to control remote resources from a single central point of the system. A typical example consists of a licensing application; this tool allows metering the usage of desired software products on target computers (or endpoints) of a network, under the control of a dedicated server; generally, the information collected on the server is then used for charge-back accounting. A commercial licensing application available on the market is the "Tivoli License Manager (TLM)" by IBM Corporation.

The management of the endpoints often requires the uploading onto the server of configuration information either of the logical type or of the physical type for each endpoint. For example, the logical configuration information indicates the software products that are used on the endpoint, while the physical configuration information indicates the hardware structure of the endpoint (such as the number of microprocessors). In this way, the server can associate the correct charging rate to the usage of every software product; indeed, the charging rate of most software products varies according to the hardware configuration of the endpoint where they run (for example, increasing with the number of microprocessors available).

In the above-described scenario, a problem is experienced whenever the endpoints do not consist of real computers. For example, the endpoints may be implemented by virtual machines or logical partitions on a (physical) host machine; those solutions are becoming more and more popular, since they allow simulating a high number of (logical) guest machines that are very easy to maintain (without requiring the proliferation of different real computers).

However, in this condition the endpoints do not have the possibility of gathering the physical configuration information that is required by the server (for example, the number of microprocessors that are actually available); indeed, this information is typically hidden to the guest machines, because of either a deliberate design choice or an intrinsic limitation of the environment. In any case, even when some sort of access to the physical configuration information of the corresponding host machine is available, it is generally impossible for the guest machines to get a full picture of its hardware structure.

All of the above may impair the correct operation of the licensing application (and more generally of any other system management application). Particularly, the server is unable to associate the correct charging rate to the usage of the software products on the different endpoints (for example, because the number of their microprocessors is not available). This drawback is more acute when the server receives inaccurate information that may be available to the endpoints. A typical example is a software product in execution on a number of virtual machines (each on giving the appearance of a real computer having the sole control of the whole resources of the host machine); in this case, the server may be mislead to consider the software product in use on multiple computers, each one having the same hardware structure of the corresponding host machine. This involves the risk of having a wrong charge-back for the usage of the software products.

SUMMARY OF THE INVENTION

According to the present invention, the idea of de-coupling the collection of the logical configuration information and of the physical configuration information is suggested.

Particularly, an aspect of the invention proposes a method for managing a plurality of data processing target entities by a data processing control entity (such as a server computer). The target entities consist of logical guest entities (or machines), which are implemented on one or more physical host entities (or machines). The management of each guest entity requires physical configuration information and logical configuration information relating to the guest entity; the physical configuration information is not available inside the guest entity. For each guest entity, an enabling module (running in connection with the corresponding host entity) gathers the physical configuration information relating to the guest entity. The enabling module then causes the transmission of the physical configuration information to the control entity. Moreover, a managing module (running in the guest entity) gathers the logical configuration information relating to the same guest entity. The managing module then causes the transmission of the logical configuration information to the control entity.

In an embodiment of the invention, the enabling module runs directly in the host machine or in a corresponding hardware management console.

Preferably, the transmission of the physical configuration information to the server is achieved by passing the physical configuration information from the enabling module to the managing module, which in turn transmits it to the server.

For this purpose, a suggested choice is of writing the physical configuration information into a public memory area of the guest machine (such as specific variables or registry keys), which memory area is accessible without requiring any user credentials (instead needed to access the guest machine).

Alternatively, the physical configuration information may be transmitted by the enabling module to the server directly.

Typically, the guest machine consists of a virtual machine or a logical partition of the host machine.

Moreover, the physical configuration information generally indicates the hardware resources of the host machine and/or the hardware resources assigned to the guest machine.

For example, the proposed solution finds use in a licensing application.

Another aspect of the invention proposes a computer program for performing the method.

A further aspect of the invention proposes a corresponding system.

The characterizing features of the present invention are set forth in the appended claims. The invention itself, however, as well as further features and the advantages thereof will be best understood by reference to the following detailed description, given purely by way of a nonrestrictive indication, to be read in conjunction with the accompanying drawings.

REFERENCE TO THE DRAWINGS

DETAILED DESCRIPTION

Figure 1A:
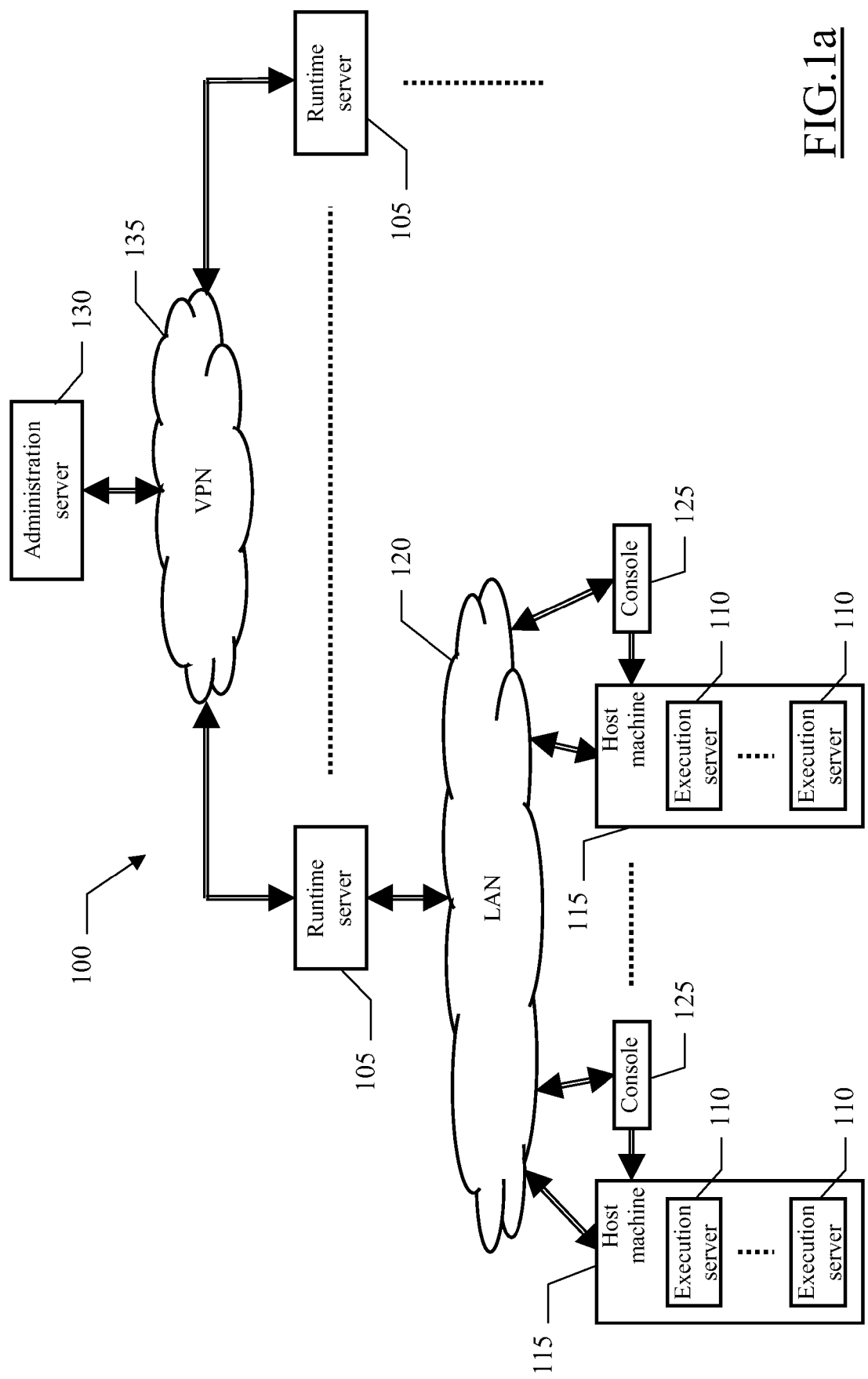
FIG. 1a is a schematic block diagram of a data processing system in which the solution according to an embodiment of the invention is applicable.

With reference in particular to FIG. 1a, a data processing system 100 with distributed architecture is depicted. The system 100 implements a license management infrastructure (for example, based on the above-mentioned TLM), which allows metering the usage of selected software products (such as computer programs). The system 100 includes one or more independent organizations (only one shown in the figure), which are completely separate and distinct from each other. Within the organization, one or more divisions are defined.

Each division is formed by a runtime server 105, which directly controls the usage of assigned software products on a set of corresponding execution servers (or nodes) 110. Some of the execution servers 110 consist of logical guest machines that are implemented on physical host machines 115; each host machine 115 (such as of the "zSeries", "AS/400" or "Power5" type by IBM Corporation) supports one or more execution servers 110 (for example, by means of corresponding virtual machines or logical partitions). The runtime server 105 and all the execution servers 110 of the division communicate through a network 120 (for example, a LAN). Moreover, an external console 125 (for example, consisting of a PC) may be directly connected to each host machine 115 (such as by means of a cable); the console 125 is used to manage a hardware configuration of the host machine 115. In a particular implementation, all the consoles 125 also communicate with the runtime server 105 through the LAN 120.

The different runtime servers 105 report to a single administration server 130, which implements a central control point for inventory, procurement, and accounting information of the whole organization; the runtime servers 105 and the administration server 130 are connected to a different network 135 (for example, a Virtual Private Network or VPN based on the Internet).

Figure 1B:
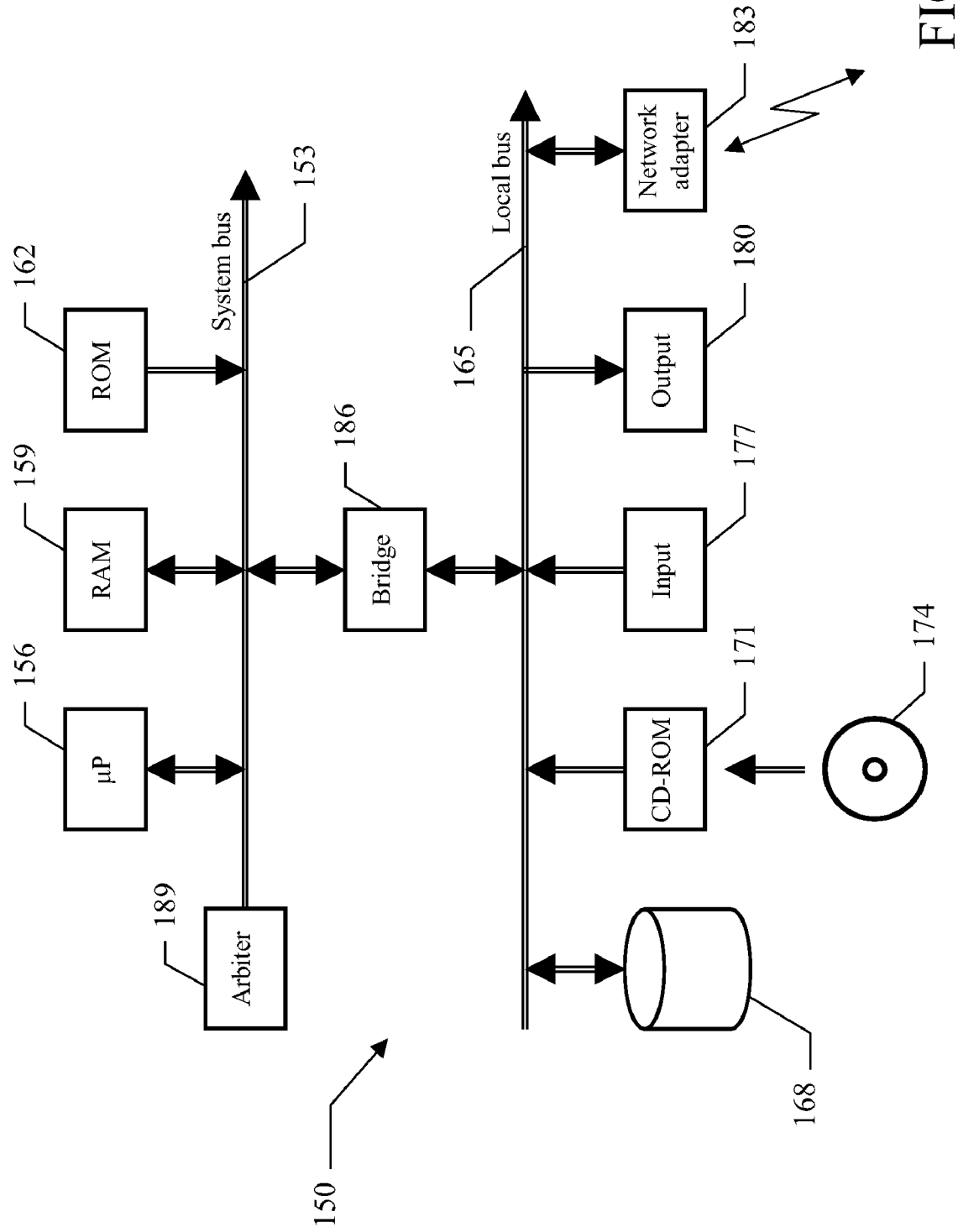
FIG. 1b shows the functional blocks of an exemplary computer of the system.

Considering now FIG. 1b, a generic computer of the system (runtime server, host machine for the execution servers, console, or administration server) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Several peripheral units are clustered around a local bus 165 (by means of respective interfaces). Particularly, a mass memory consists of one or more hard-disks 168 and drives 171 for reading CD-ROMs 174. Moreover, the computer 150 includes input units 177 (for example, a keyboard and a mouse), and output units 180 (for example, a monitor and a printer). An adapter 183 is used to plug the computer 150 into the system. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
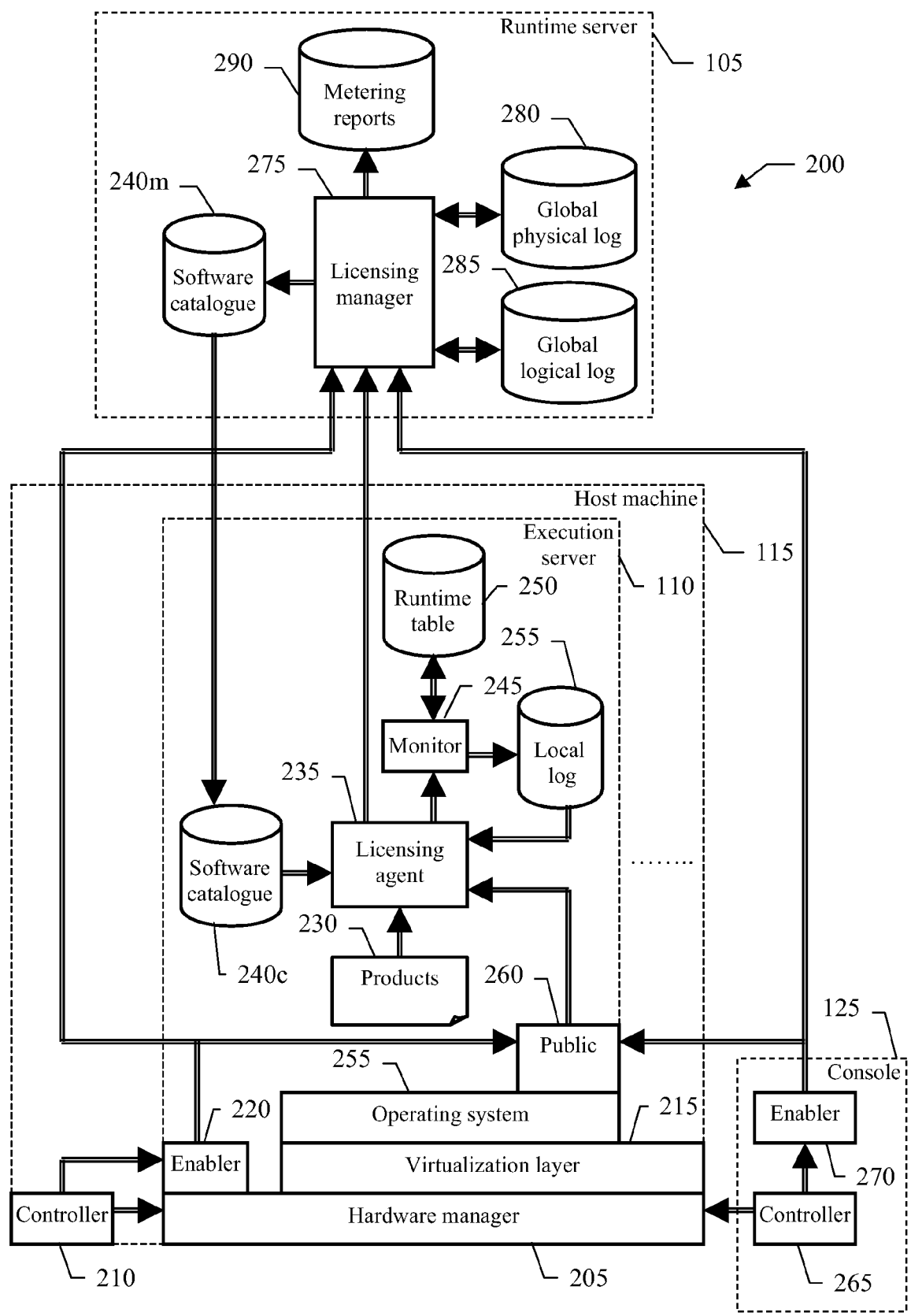
FIG. 2 depicts the main software components that can be used to practice the solution according to an embodiment of the invention.
Figure 3A:
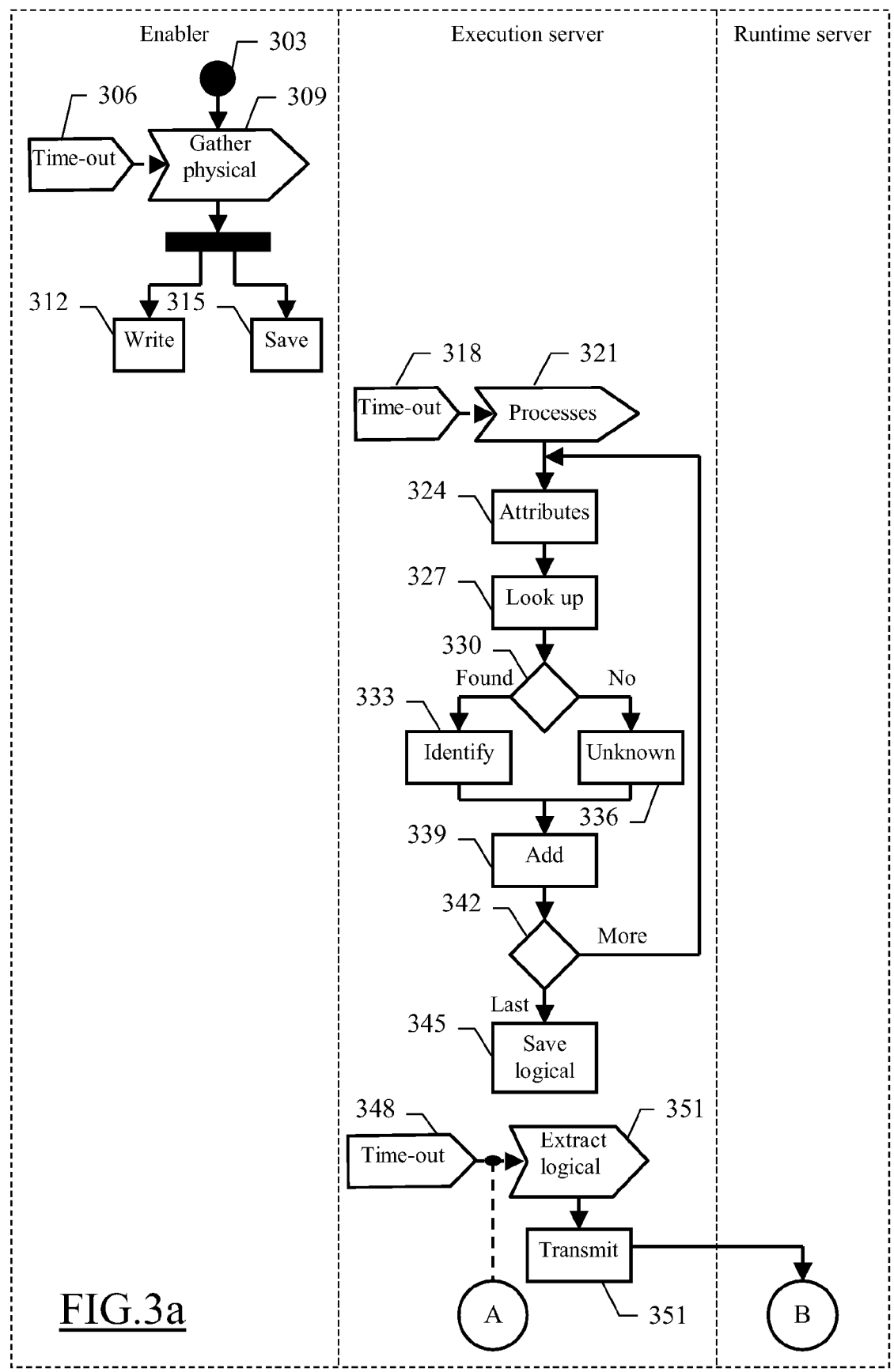
FIGS. 3a-3b show a diagram describing the flow of activities relating to an implementation of the solution according to an embodiment of the invention.
Figure 3B:
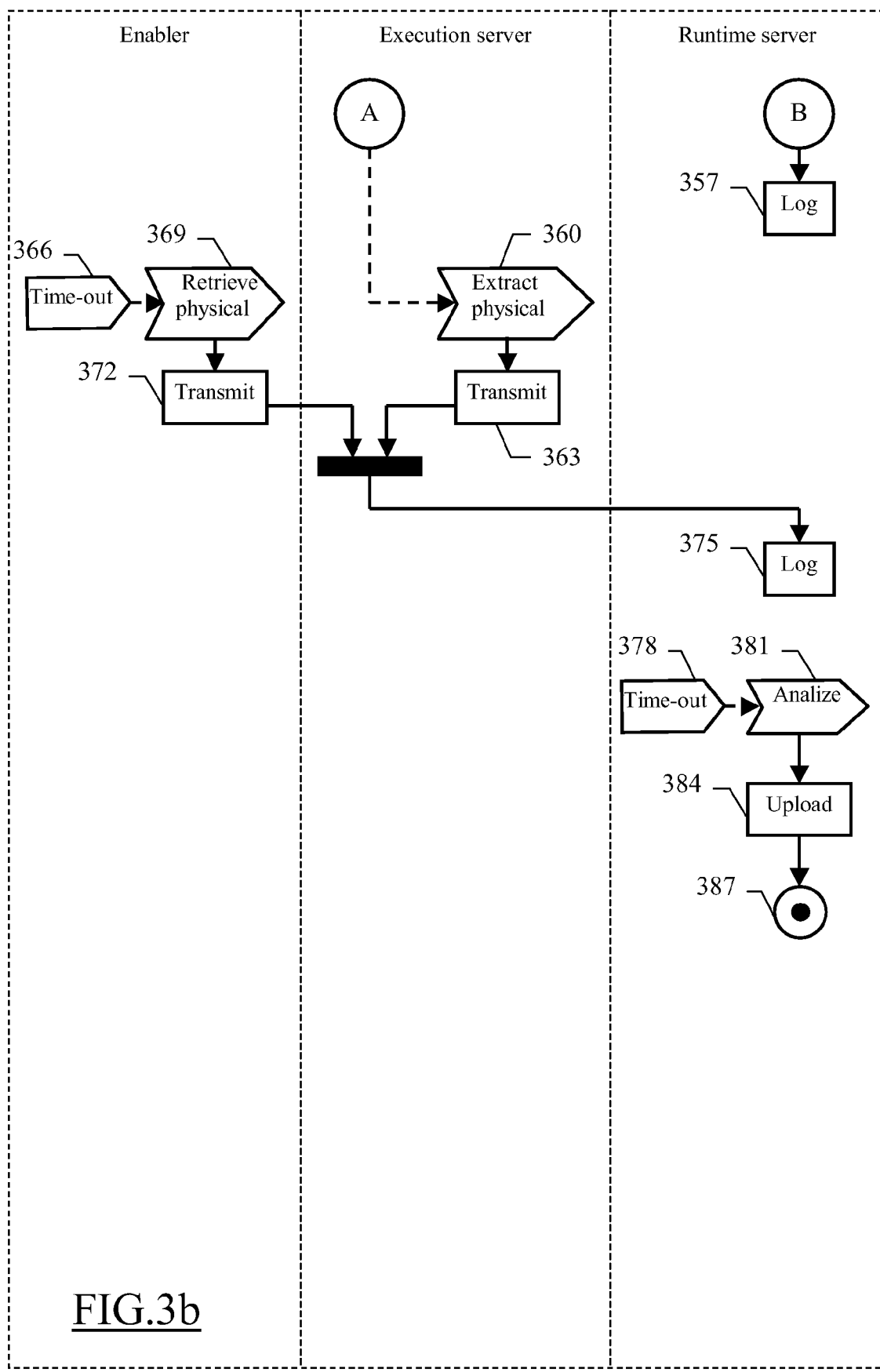

Moving to FIG. 2, the main software components that run on the above-described system are denoted as a whole with the reference 200. The information (programs and data) is typically stored on the hard-disk and loaded (at least partially) into the working memory of each computer when the programs are running. The programs are initially installed onto the hard disk, for example, from CD-ROM.

Considering in particular a generic host machine 115, a manager 205 controls its hardware configuration; for example, the hardware manager 205 defines the hardware resources that are available (such as the microprocessors, working memory, mass storage, peripheral units), handles their set up, and the like. Moreover, the hardware manager 205 may also implement a Capacity on Demand (CoD) policy. Particularly, when the host machine 115 has been purchased with the CoD option it includes more hardware resources than it is required for its standard use. A subset of the hardware resources (normally used) is permanently available; the remaining extra hardware resources are enabled (and then paid) on-demand only when they are actually needed. For example, the host machine 115 may consist of a full-configured, 16-microprocessor computer; 12 microprocessors are permanently available, while the extra 4 microprocessors are enabled dynamically (such as for some hours in response to a workload peak). Commercial products that support the CoD option are the "zseries", "AS/400" and "Power5" computers by IBM Corporation. The hardware manager 205 is operated by a controller 210; the controller 210 implements a user interface, which allows viewing and updating the hardware configuration of the host machine 115. Particularly, when the host machine 115 implements the CoD option the controller 210 is also used to enable/disable the extra hardware resources (by means of a corresponding licensing code).

A virtualization layer 215 simulates multiple guest machines, which implement the different execution servers 110 running on the host machine 115. Particularly, the virtualization layer 215 is used to provide multiple virtual machines; each virtual machine consists of an abstract environment giving the appearance of a real computer (which the virtual machine has sole control of). For this purpose, the virtualization layer 215 may assign some of the available hardware resources of the host machine 115 (such as a shared microprocessor) to each virtual machine for its simulation. The number of virtual machines that can be created is theoretically infinite, and it is practically limited by the overhead of the host machine 115 for their simulation. Examples of commercial virtualization layers that provide this functionality are the "VMware" by IBM Corporation or the "Microsoft Virtual Server 2005 (MSVS)" by Microsoft Corporation. Alternatively, the virtualization layer 215 is used to split the host machine 115 into multiple Logical Partitions (LPARs). Each logical partition consists of a subset of the hardware resources of the host machine 115, which operates independently as a separate computer. In this case, the number of logical partitions that can be created depends on the available hardware resources (and especially the microprocessors). Examples of commercial products that support the logical partitioning are the "zSeries" and "AS/400" computers by IBM Corporation.

In any case, the information about the hardware resources of the host machine 115 (such as its serial number, the total number of microprocessors, or the number of permanent and on-demand microprocessors) and about the hardware resources that are assigned to each guest machine (such as the number of microprocessor and its type) is hidden by the virtualization layer 215; therefore, this (inventory) information, defining a physical configuration of the execution server 110, is not visible inside the execution servers 110 running on top of the virtualization layer 215. Typically, this is due to a deliberate design choice relating to the implementation of the environment or to an intrinsic limitation of the virtualization layer being used. The same physical configuration information may instead be gathered by an enabler 220 at the same level of the virtualization layer 215.

With reference now to a generic execution server 110 implemented on the host machine 115, a guest operating system 225 (such as the "zOS" by IBM Corporation or the "MS Windows" by Microsoft Corporation) defines its software platform, on top of which any application program can run. As pointed out above, the operating system 225 works as if it was installed on a real computer (as simulated by the virtualization layer 215).

One or more software products 230 are installed on the execution server 110. A licensing agent 235 periodically detects the software products 230 that are running on the execution server 110 (for example, every 1-10 minutes). For this purpose, the licensing agent 235 accesses a local copy of a software catalogue 240c that is downloaded from the licensing server 105 (for example, periodically or at any change thereof). The software catalogue 240c lists all the known software products to be metered in the organization. Each software product is identified by a signature defined by one or more executable modules, which indicate the usage of the software product when running; typically, each executable module is specified in the software catalogue 240c by means of multiple attributes (such as its name, size and checksum).

More in detail, the licensing agent 235 retrieves a list of processes that are active on the execution server 110 (from the operating system 225). For each process, the licensing agent 235 accesses the corresponding executable module so as to retrieve its further attributes (i.e., the size and checksum in the example at issue). The licensing agent 235 then tries to identify the corresponding software product by comparing the attributes of the executable module with the content of the software catalogue 240c. The list of software products currently running on the execution server 110 (including the available information about any unknown software product that has not been recognized) is supplied to a monitor 245. The monitor 245 accesses a runtime table 250, which provides a snapshot of the software products in use on the execution server 115; moreover, the monitor 245 also accesses a local log 255 storing a logical configuration of the execution server 110 (defined by the start and the stop of any software product). The monitor 245 compares the list of running software products (from the licensing agent 235) with the content of the runtime table 250, so as to detect the known software products that have been started or stopped (since the last iteration of the process). The information so obtained is added to the local log 255 (together with a corresponding time-stamp); at the same time, the runtime table 250 is updated accordingly.

In a completely independent way, the enabler 220 periodically gathers the physical configuration information of the execution server 110 (for example, every 5-20 minutes). The enabler 220 writes this information into a public area 260 of the execution server 110, by adding a new line whenever any change has occurred since the last iteration of the process (together with a corresponding time-stamp). For example, in the "VMware" environment the public area 260 consists of so-called "guestinfo" variables, which are publicly available without the need of providing any user credentials (such as name and password), which are instead necessary for accessing the execution server 110; in this case, a set of "PERL" Application Program Interfaces (APIs) is provided to view and update the "guestinfo" variables. Alternatively, in the "MSVS" environment, the public area 260 consists of dedicated keys of a registry, which is commonly used to store any configuration information of the execution server 110 by the operating system 225; in this condition, an interface of APIs conforming to the "Component Object Model (COM)" is provided to define new registry keys and to maintain them. In any case, the proposed solutions allow obtaining the desired result without any security breach (since no confidential data is required for passing the physical configuration information to the execution server 110).

The licensing agent 235 periodically extracts the logical configuration information of the execution server 110 from the local log 255 (for example, every 6-24 hours); this logical configuration information is then transmitted to the runtime server 105 (together with an identifier of the execution server 110). At the same time, the licensing agent 235 also extracts the physical configuration information of the execution server 110 from the public area 260, and transmits it to the runtime server 105 independently (together with the same identifier of the execution server 110).

In a different embodiment, the enabler 220 may gather the physical configuration information of all the execution servers 110 implemented on the host machine 115 at the same time. In this case, the enabler 220 transmits the physical configuration information of all the execution servers 110 (differentiated by means of the corresponding identifiers) to the runtime server 105 directly, through an independent communication channel.

Alternatively, the hardware manager 205 of the host machine 110 may also be operated by another controller 265 running on the associated console 125. A different enabler 270 now interfaces the controller 265 to gather the physical configuration information of the execution servers 110 implemented on the host machine 115. As in the preceding case, the enabler 270 either writes the physical configuration information of each execution server 110 into the corresponding public area 260 (for its transmission to the runtime server 105 by the licensing agent 235) or transmits the physical configuration information of all the execution servers 110 to the runtime server 105 directly.

The above-described techniques provide a very high flexibility. Indeed, the logical and physical configuration information is always received by the runtime server independently (irrespectively of how it has been transmitted); therefore, it is possible to change the operation of the host machines without any impact on the runtime server.

Considering now the runtime server 105, a licensing manager 275 receives the physical and logical configuration information of every execution server 110 in the division. The licensing manager 275 saves the physical configuration information into a corresponding global log 280 and the logical configuration information into a corresponding global log 285. For each execution server 110, the licensing manager 275 (according to the relevant content of the global physical log 280 and the global logical log 285) generates a metering report that is stored into a repository 290. The metering report lists the software products that have been used on the execution server 110 in the period at issue (such as the last day), together with the length of their use in any time window defined by a different physical configuration of the execution server 110; for example, the metering report may indicate that a specific software product ran for 4 hours when the host machine had 12 microprocessors enabled (all permanent), and for further 2 hours when the host machine had 14 microprocessors enabled (12 permanent and 2 on-demand). Typically, the metering report also points out any anomalous event occurred on the execution server 110 (such as the use of unknown software products).

The licensing manager 275 periodically uploads all the metering reports in the repository 290 onto the administration server (such as at the end of every day). Typically, this information is used to charge a prescribed licensing fee for any usage of the known software products (according to pre-defined rates specified by their conditions of use); for example, in the above-mentioned situation a predetermined amount is charged for each hour of use of the software product on the 12 permanent microprocessors, and a higher amount is charged for each additional hour of use of the same software product on the 14 (12 permanent and 2 on-demand) microprocessors. Moreover, the licensing manager 275 also downloads a main copy of the software catalogue (denoted with 240*m*) from the same administration server (for example, periodically or at any change thereof).

The logic flow of an exemplary process that can be implemented in the above-described system (to manage a generic execution server) is represented with a method 300. The method 300 begins at the black start circle 303 in the swim-lane of the enabler of the corresponding host machine (running either on the host machine itself or on the associated console). As soon as a predefined time-out expires (block 306), the enabler gathers the physical configuration information of the execution server at block 309.

The flow of activity then forks into two branches that are executed alternatively. Particularly, in an embodiment of the invention the physical configuration information is written at block 312 into the public area of the execution server (i.e., the dedicated variables or registry keys). In another embodiment of the invention, the same information is instead saved by the enabler directly at block 315 (for example, into an internal table).

In both cases, the method 300 joints at block 318 in the swim-lane of the execution server as soon as a further time-out expires. In response thereto, the licensing agent at block 321 retrieves the list of the active processes. A loop is then performed for each process (starting from the fist one); the loop begins at block 324 wherein the licensing agent accesses the corresponding executable module so as to retrieve its required attributes (i.e., the size and checksum). Continuing to block 327, the licensing agent compares the size and the checksum of the executable module with the ones specified in the entry of the software catalogue for its name (if any). When the attributes of the executable module match the ones indicated in the software catalogue (decision block 330), the corresponding software product is identified at block 333. Conversely, the software product is set as unknown at block 336 (saving its available information). In both cases, the information so obtained is added to the list of software products that are currently running on the execution server at block 339. A test is then made at block 342 to determine whether all the processes have been analyzed. If not, the method returns to block 324 to reiterate the same operations for a next process. Conversely, the loop is exit descending into block 345; in this phase, the logical configuration information of the execution server is saved into the corresponding log.

As soon as another time-out expires (block 348), the licensing manager extracts the logical configuration information of the execution server from its log at block 351. Continuing to block 354, the logical configuration information is transmitted to the runtime server (together with the identifier of the execution server). In response thereto, the runtime server saves this information (into the corresponding log) at block 357.

At the same time, the block 360 is also reached from block 348; therefore, the licensing agent also extracts the physical configuration information of the execution server from the public area. The physical configuration information (together with the identifier of the execution server) is likewise transmitted to the runtime server at block 363. Alternatively, the flow of activity moves from block 366 to block 369 (in the swim-lane of the enabler) as soon as a further time-out expires; as a result, the enabler retrieves the physical configuration information of all the execution servers that are implemented on the host machine. Passing to block 372, the enabler transmits the physical configuration information so obtained (differentiated by means of the corresponding identifiers) to the runtime server.

The process now joints at block 375 (either from block 363 or from block 372), wherein the runtime server saves the received information into the global physical log.

As soon as an independent time-out expires (block 378), the runtime server at block 381 generates the metering report for each execution server. The licensing manager then uploads all the metering reports onto the administration server at block 384. The method ends at the concentric white/black stop circles 387.

In this way, the runtime server always receives the (logical and physical) configuration information required to manage the execution servers. This is true even when the execution servers have no access (or only partial access) to their physical configuration information, because the information is hidden in some way be the virtualization layer (either deliberately or unintentionally).

This ensures the correct operation of the licensing application (and more generally of any other system management application). Particularly, the runtime server is now able to associate the right charging rates to the usage of the software products on the different execution servers.

It should be noted that the proposed solution ensures that the information received by the runtime server is always as accurate as possible. Therefore, the risk of having a wrong charge-back for the usage of the software products is strongly reduced.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

Particularly, similar considerations apply if the system has a different architecture or consists of equivalent units; for example, the system may include any other number of host machines (each one implementing any number of guest machines, down to a single one). Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

Without departing from the principles of the invention, any other physical and/or logical configuration information may be supported (such as the identity of the user of the guest machine, the printers attached to the host machine, and so on); it is also emphasized that the physical and/or logical configuration information may provide a static picture of the execution server only (without any information about its change over time).

In any case, the enabler may be replaced with any other equivalent module.

Likewise, it is possible to have the enabler write the physical configuration information in a similar public memory area of the guest machine (for example, a dedicated file); more generally, whatever communication link between the licensing agent and the enabler is feasible for exchanging the physical configuration information. In addition, nothing prevents the licensing agent to transmit both the logical and the physical configuration information to the runtime server together.

Similar considerations apply if the enabler transmits the physical configuration information to the runtime server in any equivalent manner. It should also be noted that it is possible to have a reverse flow of information (i.e., with the logical configuration information that is passed by the licensing agent to the enabler for its transmission to the runtime server).

Even though in the preceding description reference has been made to virtual machines and logical partitions, this is not to be intended as a limitation (with the proposed solution that may be applied to any equivalent logical guest machine implemented on a physical host machine).

In any case, the physical configuration information may only indicate the hardware resources of the host machine or the hardware resources assigned to the guest machine (or more generally any other hardware characteristics relating to the guest machine in their broadest sense).

It should be readily apparent that the implementation of the present invention is not limited to any specific licensing application and/or technique for identifying the software products used on the execution servers; for example, it is possible to detect the invocation of any new software product (or any equivalent digitally encoded product, such as an electronic book) by intercepting the launching of the corresponding process (for example, using a kernel hooking technique). In addition, the available information may be used to control the usage of the software products (such as by aborting their execution when they are not authorized to run). However, the reference to the licensing application must not be interpreted in a limitative manner, with the same solution that may be used in any other environment (for example, in a performance monitor application, a load-balancing application, or more generally in any other system management application).

Similar considerations apply if the program (which may be used to implement the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for managing licenses in a plurality of data processing target entities by a data processing control entity, the target entities consisting of logical guest entities implemented on at least one physical host entity, and wherein for each guest entity the method includes:
    managing each guest entity by requiring physical configuration information and logical configuration information relating to the guest entity, wherein the host entity includes hardware resources, each guest entity implemented on the host entity being assigned at least part of the hardware resources, and wherein the physical configuration information is indicative of the hardware resources that are assigned to the guest entity;
    gathering, during a period, the physical configuration information relating to the guest entity by an enabling module running in connection with the corresponding host entity;
    causing the transmission of the physical configuration information from the enabling module to the data processing control entity;
    detecting a set of software products executing in the guest entity during the period;
    selecting a subset of the set of software products such that a signature associated with a software product in the subset matches a second signature specified in a software catalogue downloaded in the guest entity from a licensing server, execution of the subset during the period forming the logical configuration information relating to the guest entity;
    causing the transmission of the logical configuration information from a managing module to the data processing control entity; and
    metering at the data processing control entity, a usage of a licensed software product in the guest entity using the physical configuration information during the period and the logical configuration information during the period.

2. The method according to claim 1, wherein the step of causing the transmission of the physical configuration information from the enabling module to the data processing control entity includes:
    passing the physical configuration information from the enabling module to the managing module; and
    transmitting the physical configuration information from the managing module to the data processing control entity.

3. The method according to claim 2, wherein user credentials are required to access the guest entity, the step of passing the physical configuration information from the enabling module to the managing module including:
    writing the physical configuration information into a public memory area of the guest entity, the public memory area being accessible without requiring the user credentials.

4. The method according to claim 1, wherein the step of causing the transmission of the physical configuration information from the enabling module to the data processing control entity includes:
    transmitting the physical configuration information from the enabling module to the data processing control entity.

5. The method according to claim 1, wherein the guest entity is a virtual machine simulated by the host entity or a logical partition of the host entity.

6. A licensing management system, comprising a computer usable non-transitory storage medium including computer usable code, for managing a plurality of data processing target clients by a data processing control server, the target clients consisting of logical guest machines implemented on at least one physical host machine, and wherein the system includes:
- an enabling module and a managing module for managing each guest machine by requiring physical configuration information and logical configuration information relating to the guest machine, wherein the host machine includes hardware resources, each guest machine implemented on the host machine being assigned at least part of the hardware resources, and wherein the physical configuration information is indicative of the hardware resources that are assigned to the guest machine;
- the enabling module running in connection with each host machine for gathering, during a period, the physical information relating to each guest machine implemented on the host machine and for causing the transmission of the physical information to the data processing control server;
- a monitoring module running in each guest machine for detecting a set of software products executing in the guest machine during the period;
- the managing module running in each guest machine for selecting a subset of the set of software products such that a signature associated with a software product in the subset matches a second signature specified in a software catalogue downloaded in the guest machine from a licensing server, execution of the subset during the period forming the logical configuration information relating to the guest machine;
- the managing module running in each guest machine for causing the transmission of the logical information to the data processing control server; and
- the data processing control server for metering a usage of a licensed software product in the guest machine using the physical configuration information during the period and the logical configuration information during the period.

7. A data processing system including a plurality of data processing target entities and a data processing control entity for managing licenses in the target entities, the target entities consisting of logical guest entities implemented on at least one physical host entity, and wherein the system includes:
- a storage device including a storage medium, wherein the storage device stores computer usable program code;
- a processor, wherein the processor executes the computer usable program code;
- an enabling module and a managing module for managing each guest entity by requiring physical configuration information and logical configuration information relating to the guest entity, wherein the host entity includes hardware resources, each guest entity implemented on the host entity being assigned at least part of the hardware resources, and wherein the physical configuration information is indicative of the hardware resources that are assigned to the guest entity;
- the enabling module running in connection with each host entity for gathering, during a period, the physical configuration information relating to each guest entity implemented on the host entity and for causing the transmission of the physical configuration information to the data processing control entity;
- a monitoring module running in each guest entity for detecting a set of software products executing in the guest entity during the period;
- the managing module running in each guest entity for selecting a subset of the set of software products such that a signature associated with a software product in the subset matches a second signature specified in a software catalogue downloaded in the guest entity from a licensing server, execution of the subset during the period forming the logical configuration information relating to the guest entity;
- the managing module running in each guest entity for causing the transmission of the logical configuration information to the data processing control entity; and
- the control server for metering a usage of a licensed software product in the guest entity using the physical configuration information during the period and the logical configuration information during the period.

8. The system according to claim 6, wherein causing the transmission of the physical configuration information from the enabling module to the data processing control server includes:
- passing the physical configuration information from the enabling module to the managing module; and
- transmitting the physical configuration information from the managing module to the data processing control server.

9. The system according to claim 8, wherein user credentials are required to access the guest machine, passing the physical configuration information from the enabling module to the managing module including:
- writing the physical configuration information into a public memory area of the guest machine, the public memory area being accessible without requiring the user credentials.

10. The system according to claim 6, wherein causing the transmission of the physical configuration information from the enabling module to the data processing control server includes:
- transmitting the physical configuration information from the enabling module to the data processing control server.

11. The system according to claim 6, wherein the guest machine is a virtual machine simulated by the host machine or a logical partition of the host machine.

12. The system according to claim 7, wherein causing the transmission of the physical configuration information from the enabling module to the data processing control entity includes:
- passing the physical configuration information from the enabling module to the managing module; and
- transmitting the physical configuration information from the managing module to the data processing control entity.

13. The system according to claim 12, wherein user credentials are required to access the guest entity, passing the physical configuration information from the enabling module to the managing module including:
- writing the physical configuration information into a public memory area of the guest entity, the public memory area being accessible without requiring the user credentials.

14. The system according to claim 7, wherein causing the transmission of the physical configuration information from the enabling module to the data processing control entity includes:

transmitting the physical configuration information from the enabling module to the data processing control entity.

15. The system according to claim 7, wherein the guest entity is a virtual machine simulated by the host entity or a logical partition of the host entity.

16. The method according to claim 1, wherein the metering the usage of the licensed software product further comprises:

determining that the licensed software product was included in the logical configuration information during the period;

determining that the licensed software product was utilizing hardware according to the physical configuration information during the period; and charging a prescribed licensing fee for the usage of the licensed software product on a physical configuration according to the physical configuration information for the period.

17. The method according to claim 1, wherein detecting the set of software products further comprises:

taking a snapshot of a set of processes executing in the guest entity;

accessing, for a process in the set of processes, an executable module corresponding to the process;

retrieving a set of attributes of the executable module.

18. The method according to claim 17, wherein the set of attributes of the executable module includes a checksum for the executable module.

19. The method according to claim 17, wherein the signature associated with the software product comprises the set of attributes of the executable module.

20. The method according to claim 17, wherein selecting the subset of the set of software products further comprises:

finding that a value of an attribute in the set of attributes matches a second value in the second signature in the software catalogue;

concluding based on the finding, that the software product is the licensed software product;

selecting the licensed software product associated with the second signature in the software catalogue; and including the licensed software product in the subset.

\* \* \* \* \*